May 14, 1957 E. A. BOURQUE ET AL 2,792,083
HYDRAULIC BRAKE SYSTEM
Filed Feb. 5, 1953
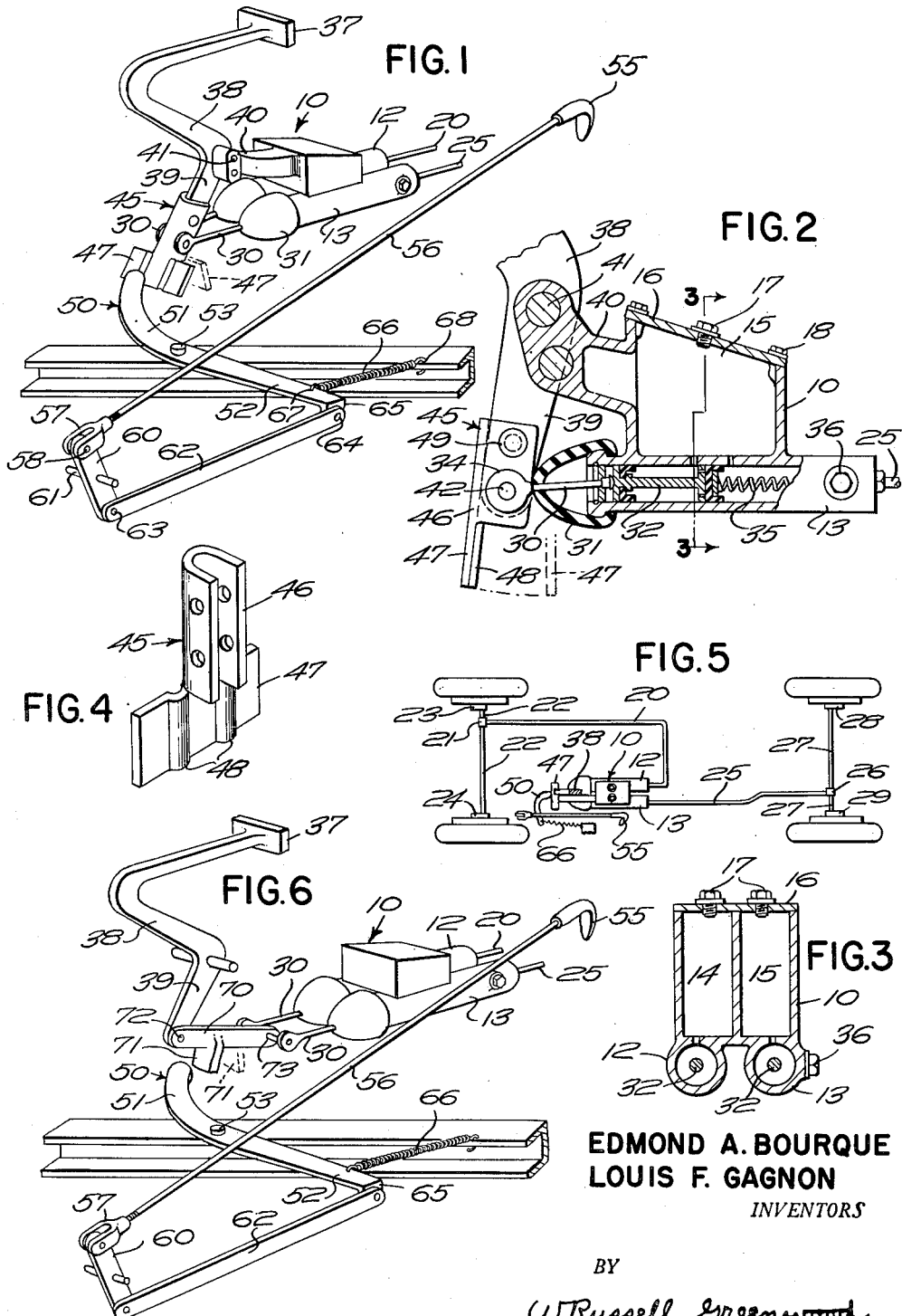
EDMOND A. BOURQUE
LOUIS F. GAGNON
INVENTORS
BY
W. Russell Greenwood
ATTORNEY

United States Patent Office 2,792,083
Patented May 14, 1957

2,792,083

HYDRAULIC BRAKE SYSTEM

Edmond A. Bourque and Louis F. Gagnon,
Manville, R. I.

Application February 5, 1953, Serial No. 335,264

2 Claims. (Cl. 188—106)

The present invention relates to hydraulic braking systems of automotive vehicles. More particularly it has to do with a hydraulic braking system embodying dual master hydraulic cylinders the pistons of which are operated by a single pedal and in which the hydraulic connections of the master cylinders are such that one of which operates the hydraulic service brakes of the front wheels of the vehicle and the other of which operates the hydraulic service brakes of the rear wheels.

It is a primary object of the invention to provide an automotive braking system of the foregoing type which will be so arranged that the dual master cylinders can be manually operated independently of the foot brake pedal to control and apply the hydraulic service brakes whereby they will operate as the emergency braking system of the vehicle.

Another object of the invention is to provide a braking system, as described above, whereby in the event that should one of the dual master cylinders either fail or become ineffective to operate the brakes at either the front or rear wheels, as the case may be, the functioning of the other master cylinder will not be impaired or interfered with by the above-mentioned difficulties but will remain operative to control the brakes at the other set of wheels and the braking force applied by the pressure developed in the single master cylinder can be effected by operation of the brake pedal, or the emergency hand brake lever, or both.

The nature of the invention will be readily understood from the following description when read in connection with the accompanying drawings, and the novel features will be particularly pointed out in the appended claims.

In the drawings:

Fig. 1 is a fragmentary diagrammatic view showing the fluid pressure generating portion of a hydraulic braking system incorporating dual master cylinders operated by a foot pedal, and embodying one form of our invention for operating them by the emergency brake lever independently of the pedal whereby the hydraulic braking system also will serve as the emergency braking system of the vehicle;

Fig. 2 is an elevational view, partly in vertical longitudinal section, of one of the dual master cylinders, and showing one form of shoe member in its normal operating position between the ends of the brake pedal bell crank arm and the piston-actuating elements of the master cylinders in readiness for operating the latter upon movement of the shoe member by the emergency brake mechanism;

Fig. 3 is a transverse section taken on the line 3—3 of Fig. 2, looking in the direction of the arrows;

Fig. 4 is a perspective view of one form of shoe member associated with the brake pedal and the actuating elements of the master cylinders;

Fig. 5 is a diagrammatic plan view of an automobile hydraulic brake system embodying one form of the invention; and Fig. 6 is a fragmentary diagrammatic view showing another form of emergency brake arrangement for operating the dual master cylinders of the hydraulic service braking system.

Referring in detail to the drawings, the fluid pressure generating portion of a hydraulic braking system illustrated diagrammatically in Fig. 1 includes a main casing 10 which is provided at the lower portion thereof with dual fluid pressure-generating means here shown as a pair of parallel master cylinders 12 and 13. These master cylinders are integral with the casing 10 and each is of the usual hydraulic type and their structure identical so that the description of one will suffice for the other as the description proceeds.

Dual reservoir wells 14 and 15 for brake fluid are provided in the upper portion of the casing 10 directly over the master cylinders 12 and 13 respectively. As shown in Fig. 3 these reservoirs are separated by a common vertical partition and each has its bottom wall provided with the usual intake and by-pass ports in fluid communication with the particular master cylinder therebelow. A cover plate 16 having two filler plugs 17 is removably secured by bolts 18 to the top of the casing and forms the top wall of the reservoirs 14 and 15.

As illustrated in Fig. 5, the master cylinder 12 has its outlet connected by fluid conduit 20, T 21, and branch conduits 22 to conventional wheel or motor cylinders 23 and 24 which are adapted to apply the hydraulic service brakes (not shown) at the front wheels of the vehicle. Similarly, the master cylinder 13 has its outlet connected by means of fluid conduit 25, T 26, and branch conduits 28 to conventional wheel or motor cylinders 28 and 29 to operate the hydraulic service brakes (not shown) at the rear wheels of the vehicle.

The master cylinders 12 and 13 are adapted to be operated respectively, by individual actuating elements here shown as rods 30 each of which extends into the forward end of each master cylinder through the usual protective rubber boot 31 thereof and has pivotal connection at its inner end with the usual spool-type piston 32 located within the master cylinder. The outer end extremity of each of the actuating rods 30 terminates in an enlarged eye portion 34. A spring 35 normally urges the piston to the left as viewed in Fig. 2 to a fully retracted position, and is of conventional construction. A removable plug 36 is provided rearwardly of the cylinder 13 for the attachment of the usual stop light switch.

For operating each of the piston-actuating rods 30 with their associated pistons 32, a foot brake pedal 37 is operatively connected thereto by linkage which includes a bell crank lever 38 having a downwardly extending arm 39 which is pivoted to a forwardly extending arm member 40 as indicated at 41. The arm member 40 is integral with the front end of the upper portion of the main casing 10 and projects outwardly and obliquely upwardly therefrom. The eye portions 34 at the outer or forward ends of the piston-actuating rods 30 are connected together by a cross-pin 42 which passes through the lower end of the bell crank lever arm 39 through a suitable aperture therein so that both actuating rods 30 will be moved in unison by the arm 39. It thus will be seen that when the brake pedal 37 is depressed in a braking operation the bell crank lever 38 will move downwardly about its pivot 41 to swing the arm 39 toward the master cylinders 12 and 13 thereby pushing the piston-actuating rods 30 therefore of rearwardly into the respective cylinders and moving the respective pistons 32 therein to the right (Fig. 2) transmitting fluid pressure via conduit lines 20, 22, 25 and 27 to the brake fluid between the respective master cylinders and the wheel or motor cylinders at the front and rear wheels to operate the hydraulic service brakes thereof. A sudden release of the brake pedal 37 by the removal of the operator's foot therefrom will effect a rapid movement of the pistons 32 under urge of their springs 35 to a retracted position and at the same time restore the piston-actuating rods 30 to their initial protracted state.

In order that the hydraulic service braking system may also function as the emergency braking system of the vehicle, the arrangement shown in Figs. 1, 2 and 5 includes therein a plate-like shoe member 45 which is attached to the lower portion of the arm 39 of the bell crank lever 38 so as to be movable therewith along with the movement of the piston-actuating rods 30 of both master cylinders. As shown in Figs. 2 and 4, the shoe member 45 has a U-shaped upper portion 46 which embraces the opposite side faces of the lower end portion of the arm 39 and has depending from the lower part thereof a plate-like projection 47 which is provided with suitable stiffening indentations 48. The shoe member 45 is suitably secured to the arm 39 of the bell crank lever 38 as by means of a rivet 49, and by the cross-pin 42 both of which pass through suitable spaced holes provided in the U-shaped portion 46 of the shoe member 45. When thus secured the shoe member 45 is rigid with the arm 39 of the bell crank lever 38 and thus can partake of its swinging movements when the bell crank lever is actuated in either direction by the foot pedal 37.

Positioned in opposed spaced relation to the forward face of the plate 47 of said shoe member 45 when the arm 39 of the bell crank lever 38 is in its most forward position is a pivoted lever 50 having a short curved operating end portion 51 and a longer substantially straight shank portion 52, the lever being pivoted intermediate its ends upon a vertical pivot pin 53 for swinging movement thereon in a horizontal plane. For actuating the lever 50 a hand brake lever 55 is provided which is of the usual umbrella handle type and includes a relatively long rod portion 56 adjustably carrying at the lower end thereof a clevis 57 which is pivoted as at 58 to one end of a pivoted lever 60. This lever is pivoted intermediate its ends to a suitable fixed support (not shown) by means of a pivot pin 61. A link 62 is pivotally connected as at 63 and 64 to the other end of the lever 60 and a depending ear 65 of the lever 50 respectively. A spring 66 having its ends 67 and 68 attached to the pivoted lever 50 and a frame member of the vehicle serves to maintain the pivoted lever 50 in a normally inoperative position until it is actuated by movement of the hand brake lever 55. It thus will be seen that when the hand brake lever 55 is first pulled upwardly to cause the emergency braking system to function the pivoted lever 50 will be actuated by means of the linkage composed of rod 56, lever 60 and link 62 to swing the pivoted lever 50 into engagement with the forward end of the abutment element 47 which is forcibly pushed into the position shown in broken outline in Fig. 1 as the hand lever 55 is pulled further thereby forcing the piston-actuating rods 30 rearwardly into their respective master cylinders 12 and 13 to operate the hydraulic service brakes at the front and rear wheels of the vehicle. On the other hand, should either master cylinder 12 or 13 fail to operate which would render the brakes on a pair of wheels, either front or rear, inoperative, the other master cylinder will remain operative and the service brakes controlled thereby can be operated by the pedal 37 of the hand brake lever 55, or both together, so that the vehicle will continue to function with two-wheel brakes.

In Fig. 5 there is shown a slightly different arrangement which differs from the Fig. 1 arrangement in that the foot pedal bell crank lever 38 is pivotally mounted independently of the master cylinder casing 10 and the shoe member 45 which is carried by the lower end portion of the arm 39 of the bell crank lever 38 is replaced by an intermediate link member 70 having a downwardly extending plate-like abutment 71, the link 70 being pivotally connected at one end as at 72 to the lower end of the arm 39 of the brake pedal bell crank lever 38 and at its other end to a cross-pin 73 which extends between and connects the eyes of the piston-actuating rods 30 of the master cylinders 12 and 13 respectively. Preferably the link 70 has its connection substantially midway of the ends of the cross-pin 73. It thus will be seen that in accordance with this arrangement when the brake pedal 37 is depressed by the operator so as to move the arm 39 of the bell crank lever 38 and the link 70 toward the master cylinders 12 and 13, the link 70 will drive the piston-actuating rods 30 rearwardly within the cylinders of the master cylinders 12 and 13 to cause the respective pistons 32 therein to force hydraulic fluid through conduit lines 20, 22, 25 and 27 to operate the hydraulic service brakes of the front and rear wheels of the vehicle. This modification of the hand braking system operates in the same manner as the arrangement of Fig. 1. A sudden pull upwardly of the hand lever 55 effects movement of the linkage comprising rod 56, lever 60 and link 62 to swing the pivoted lever 50 into engagement with the abutment 71. Continued pulling of the hand lever 55 then effects movement of the link 70 by this abutment to the left as indicated in broken outline in Fig. 6, during which movement the link 70 operates both piston-actuating rods 30 in unison and forces fluid into the wheel motors or cylinders to operate the service brakes of the vehicle. In this arrangement the spring 66 also acts to retract the pivoted lever 50 out of the path of the abutment 71 when the hand brake lever 55 is released.

It will be seen that we have provided a novel braking system for vehicles having many inherent advantages making for safety on the highways. By utilizing dual master cylinders each of which operates only the brakes at a pair of wheels, instead of a single master cylinder presently employed that controls the brakes at the four wheels, it is found that the diametrical size of the dual cylinders may be reduced substantially so that the fluid pressures created by each and transmitted to each pair of conventional wheel cylinders controlled thereby will be of substantially the same order of magnitude as that under which they normally operate under the conventional four-wheel hydraulic braking system. The smaller diametrical size of the master cylinders and their pistons not only prevents generation of overloading pressures on the wheel motors but also enables the dual cylinders to be operated together by substantially the same pressure applied to the foot pedal as that normally required to operate a single master cylinder of conventional size.

The hand braking system of the present invention is less costly to manufacture and install than the mechanical type emergency braking systems which are standard equipment in vehicles since it eliminates the cables and auxiliary brake shoes now in present use besides adding the safety feature of having the foot pedal and emergency brake lever control the service brakes of the four wheels. Consequently both braking systems will always be in proper adjustment since there are no cables to stretch and any adjustment made in the service brakes will apply also to the emergency braking system. Furthermore, there will be less tendency to "burn out" the brake bands by attempting to drive with the emergency brake "on" because the vehicle when parked will have its four wheels locked by the service brakes and thus cannot be driven away readily without release of the hand brake lever.

While we have described two specific embodiments of out invention for illustrative purposes only, it is obvious that various other modifications may be made without departing from the true spirit and scope of our invention, and it is therefore our intention not to limit our invention in any manner whatsoever except by the terms of the appended claims.

What is claimed is:

1. In combination with the parts of an automobile including the foot pedal of a foot pedal operated brake mechanism, and the frame of the vehicle, of a hand operated actuating mechanism for operation of said foot pedal independently of the foot comprising a member attached to said foot pedal and provided with an integral plate-like abutment, a lever pivotally mounted intermediate its ends to a portion of said vehicle frame, one arm of said lever being substantially straight and the other arm being curved transversely outwardly away from its pivot and having its end extremity disposed in front of said plate-like abutment and normally in a retracted position out of contact therewith to permit said foot pedal to be operated only by the foot, a spring having one end connected to said frame and the other end connected to the straight arm portion of said lever to normally hold and restore its curved arm in a retracted position out of contact with said plate-like abutment, a second lever pivotally mounted intermediate its ends on a fixed support, a hand operated rod member operatively connected to one end of said second lever for actuating the latter, and an operative connection between the other end of said second lever and the end of said straight arm portion of the first lever for actuating the latter upon pulling of said hand operated rod member and operation of said second lever thereby to move the tip of the curved arm portion of the first lever against the plate-like abutment to push it and said foot pedal bodily in a direction to apply the vehicle brakes.

2. In combination with the parts of an automobile including the foot pedal of a foot pedal operated brake mechanism, and the frame of the vehicle, of a hand operated actuating mechanism for operation of said foot pedal independently of the foot comprising a U-shaped shoe member affixed to and embracing a portion of said foot pedal and having a laterally projecting plate-like abutment, a lever pivotally mounted intermediate its ends to a portion of said vehicle frame, one arm of said lever being substantially straight and the other arm being curved and having its end extremity disposed in front of said plate-like abutment, and normally in a retracted position out of contact therewith to permit said foot pedal to be operated only by the foot, a spring having one end connected to said frame and the other end connected to the straight arm portion of said lever to normally hold and restore its curved arm in a retracted position out of contact with said plate-like abutment, a second lever pivotally mounted intermediate its ends on a fixed support, a hand operated rod member operatively connected to one end of said second lever for actuating the latter, and an operative connection between the other end of said second lever and the end of said straight arm portion of the first lever for actuating the latter upon pulling of said hand operated rod member and operation of said second lever thereby to move the tip of the curved arm portion of the first lever into engagement with the plate-like abutment to push it and said foot pedal bodily in a direction to apply the vehicle brakes.

References Cited in the file of this patent
UNITED STATES PATENTS

| | | |
|---|---|---|
| 520,849 | Jacobs | June 5, 1894 |
| 2,002,006 | Hall | May 21, 1935 |
| 2,018,685 | Sauzedde | Oct. 29, 1935 |
| 2,115,071 | Hunt | Apr. 26, 1938 |
| 2,126,661 | Provinson | Aug. 9, 1938 |
| 2,163,633 | Sauzedde | June 27, 1939 |
| 2,185,170 | Armstrong | Jan. 2, 1940 |
| 2,241,214 | Milster | May 6, 1941 |
| 2,583,825 | Felt | Jan. 29, 1952 |